Dec. 30, 1930.  H. D. YODER  1,786,810
FLEXIBLE COUPLING FOR PUMPS
Filed Dec. 29, 1927
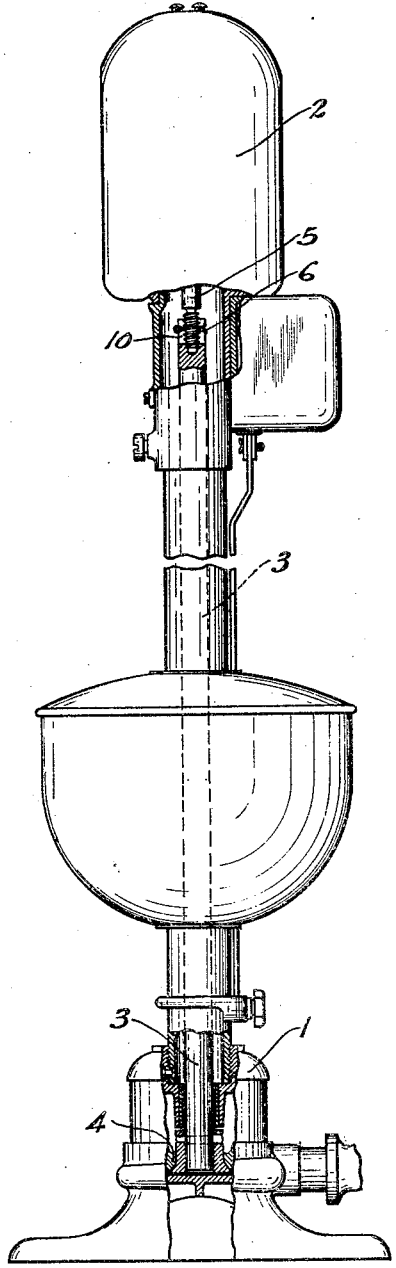
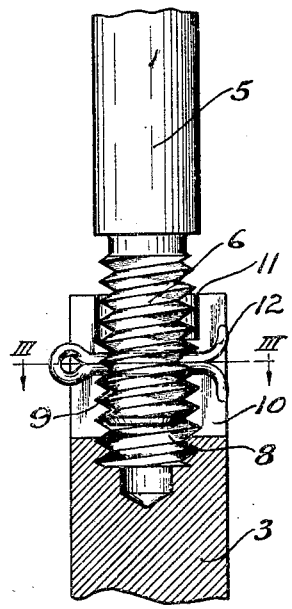
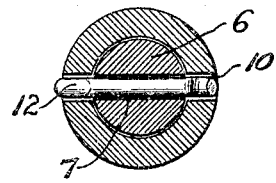
Inventor
Howard D. Yoder Patented Dec. 30, 1930

1,786,810

UNITED STATES PATENT OFFICE

HOWARD D. YODER, OF DETROIT, MICHIGAN, ASSIGNOR TO PENBERTHY INJECTOR COMPANY, OF DETROIT, MICHIGAN, A CORPORATION OF DELAWARE

FLEXIBLE COUPLING FOR PUMPS

Application filed December 29, 1927. Serial No. 243,264.

This invention relates to improvements in flexible couplings for pumps, and more particularly to improvements in a flexible coupling for uniting a driving element and a driven element, and is further highly desirable for use in a rotary pump, although it, of course, has many and varied uses.

In the past devices for operatively connecting the shaft of a rotary pump with a drive or motor shaft have proven more or less objectionable. In many instances, one or the other of these shafts is relatively long and to properly connect the same it has heretofore been necessary to provide one or more bearings between the motor and the intake chamber of the pump, which bearings, of course, were objectionably expensive. In addition these formerly known devices were objectionable, in many instances, in that they did not provide sufficient flexibility to avoid binding of the shafts, in the motor and pump bearings, and did not provide adequate means for longitudinally adjusting the pump shaft.

The present invention is designed to overcome the above noted defects and objections in the provision of a flexible coupling having sufficient guiding or alignment qualities to eliminate the use of an extra bearing, and, at the same time, provide sufficient flexibility to avoid binding of the shafts.

The invention also seeks to provide a device of the class described herein, which permits longitudinal adjustment of a pump shaft and impeller.

A further object of the present invention is to provide a coupling whereby a pump shaft may be suspended from the motor shaft, and which coupling embodies a slight flexibility therein whereby a relatively greater flexibility is obtainable at the opposite end of the pump shaft.

A still further object is to provide a coupling of the type described herein, which is exceedingly simple in construction and very economical to manufacture.

While some of the more salient features, characteristics, and advantages, of a device embodying this invention have been above pointed out, others will become apparent from the following disclosures.

The invention includes these and other features of construction and combinations of parts hereinafter described and shown in a preferred form of the drawings, as more particularly indicated by the claims.

In the drawings:

Figure 1 is a view in elevation, with parts broken away and parts in section, of a rotary pump equipped with the device embodying principles of the present invention.

Figure 2 is an enlarged fragmentary view, partly in section and partly in elevation, of the device itself.

Figure 3 is a sectional view, with parts in elevation, taken substantially along line III—III of Figure 2.

As shown in the drawings:

In the illustrated embodiment of this invention there is shown a pumping outfit comprising a rotary sump pump generally indicated by the reference numeral 1 (the details of which are set forth and described in my copending application for patent for Rotary sump pump, filed August 22, 1927, Serial No. 204,519) and a driving motor enclosed in a casing 2. The pump includes a shaft 3 to which is keyed an impeller 4. The driving motor, of course, has a shaft 5 therein which projects below the casing 2 and is operatively connected to the pump shaft 3 for driving the latter.

Novel means have been provided for connecting the motor shaft 5 and pump shaft 3, which means are, in the present instance, shown integral with the ends of the respective shafts, but which obviously may be made separate and secured thereto if so desired. The connecting means in the present instance are shown in the form of a flexible coupling which includes a threaded end 6 of reduced diameter on the motor shaft 5. This threaded projecting end 6 is provided with a transverse aperture 7 therethrough for a purpose that will later appear. The pump shaft 3 is provided at its upper end with an internally threaded bore 8 to receive the end 6 of the motor shaft 5. The pump shaft is thereby suspended from the motor shaft. As shown more clearly in Figure 2, the threads in the bore 8 on the shaft end 6 do not fit exactly, there being slight spaces between the threads as indicated at 9, which permit the shaft 3 to flex slightly with respect to the motor shaft 5. This comparatively small flexibility in the coupling, however, permits the impeller end of the pump shaft 3 to flex considerably. It is obvious, therefore, that with the motor shaft 5 held firmly in position by bearings within the motor, the impeller and other parts at the lower end of the pump shaft 3, may be slightly off center or somewhat out of alignment with the motor shaft, which non-alignment is compensated for by the flexibility of the coupling.

Means are also provided in the coupling to render the shaft 3 longitudinally, or in this instance, vertically adjustable. As shown clearly in Figures 2 and 3, the pump shaft 3 is transversely slotted, as at 10, which slot will obviously register with the aperture 7 in the shaft end 6 at every half-revolution of one shaft relative to the other. The shafts are maintained connected or coupled during operation by means, in this instance, of a cotter pin 12, passing through the aperture 7 and engaging with the slot 10. To adjust vertically the pump shaft 3 and impeller 4, it is merely necessary to remove the cotter pin 12, turn one of the shafts relative to the other until the aperture 9 again registers with the slot 10, and reinsert the pin. Obviously, a desirable adjustment may be thuswise obtained, and if more minute adjustments are desired, the shaft end 6 may be provided with other apertures, one of which will register with the slot 10 whenever one shaft is rotated, relatively to the other, a small fraction of a revolution.

As shown more clearly in Figure 2, the slotted or bifurcated end of the shaft 3 is provided with a smooth bored recess 11 of larger diameter than the total diameter of the threaded end 6 of the shaft 5. It is thus apparent that only a part of the end 6 of the shaft 5 extending between the furcations on shaft 3 is in threaded engagement with the said furcations or shaft, whereby the flexibility of the coupling is greatly enhanced.

It is to be noted in the present invention, that the coupling has sufficient flexibility therein to prevent binding of the shafts 5 and 3 in the motor and pump bearings. At the same time the coupling has sufficient guiding or alignment holding qualities to eliminate the need for any extra bearing between the motor and impeller end of the shaft. If more flexibility is desired, the threads in either the bore 8 or on the end 6 may be cut slightly deeper to render a more loose connection.

From the foregoing it is apparent that I have provided a simple and efficient shaft coupling which is flexible and adjustable, composed of few parts, and very inexpensive to manufacture.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. In a flexible coupling, a rotatable driven element having a bifurcated end, a driving element for rotating said driven element and threadedly engaging the same, and means passing through one of said elements and positioned in the bifurcated end of said driven element to maintain said engagement.

2. In a flexible coupling, a driving element, a longitudinally adjustable driven element, one of said elements having a smooth bore adjacent an end thereof terminating in a threaded bore, and a threaded end on the other of said elements freely insertable in said smooth bore and relatively loosely engageable in said threaded bore.

3. In a flexible coupling for joining a pair of shafts, a driving element on one of asid shafts, a driven element on the other of said shafts, one of said elements having a slotted portion thereon and a smooth bore therein terminating in a threaded bore of less diameter, a threaded end on the other of said elements freely insertable in said smooth bore and relatively loosely engageable in said threaded bore, and means normally extending into said slotted portion to retain said ends connected, whereby either of said shafts may flex somewhat at the coupling end thereof and flex to a greater degree at the opposite end thereof.

In testimony whereof I have hereunto subscribed my name at Detroit, Wayne County, Michigan.

HOWARD D. YODER.